R. L. D'ESPUJOLS.
VALVE GEAR OF FLUID PRESSURE ENGINES.
APPLICATION FILED JAN. 15, 1920.

1,360,099.

Patented Nov. 2, 1920.

Inventor
Robert L. d'Espujols
by
Charles L. Stauffer
Attorney.

R. L. D'ESPUJOLS.
VALVE GEAR OF FLUID PRESSURE ENGINES.
APPLICATION FILED JAN. 15, 1920.

1,361,099.

Patented Nov. 23, 1920.
3 SHEETS—SHEET 3.

Inventor.
Robert L. d'Espujols
by
Attorney.

UNITED STATES PATENT OFFICE.

ROBERT LUCIEN D'ESPUJOLS, OF JOINVILLE LE PONT, FRANCE.

VALVE-GEAR OF FLUID-PRESSURE ENGINES.

1,360,099. Specification of Letters Patent. Patented Nov. 23, 1920.

Original application filed February 6, 1915, Serial No. 6,425. Divided and this application filed January 15, 1920. Serial No. 352,588.

*To all whom it may concern:*

Be it known that I, ROBERT LUCIEN D'ESPUJOLS, a citizen of the French Republic, residing at 26, Route de Brie, Joinville le Pont, Seine, France, have invented certain new and useful Improvements in the Valve-Gear of Fluid-Pressure Engines, of which the following is a specification.

This invention relates to fluid pressure engines for automobiles and for other purposes, and has more especially for its object to provide improved means whereby a multi-cylinder engine may be operated either as a compound engine or as a triple expansion engine. It has also for its object to provide improved means for operating the distributing valves of the several cylinders of the engine.

According to the invention the engine comprises three cylinders, one a high pressure cylinder, another a medium pressure cylinder and the third a low pressure cylinder, and is provided with a suitable slide valve, serving as an intercepting slide valve whereby these cylinders can be caused to form a group acting by triple expansion, or the first two may be caused to act with live steam and the steam that has acted in the said cylinders may be exhausted into the low pressure cylinder, in which case the motor runs as a compound engine.

This arrangement of the engine renders it possible to dispense with all the intermediate members, such as a change speed gear, between the engine and the drive for the wheels and to do so without having recourse to excessive pressures.

In the accompanying drawings—

Figure 1:
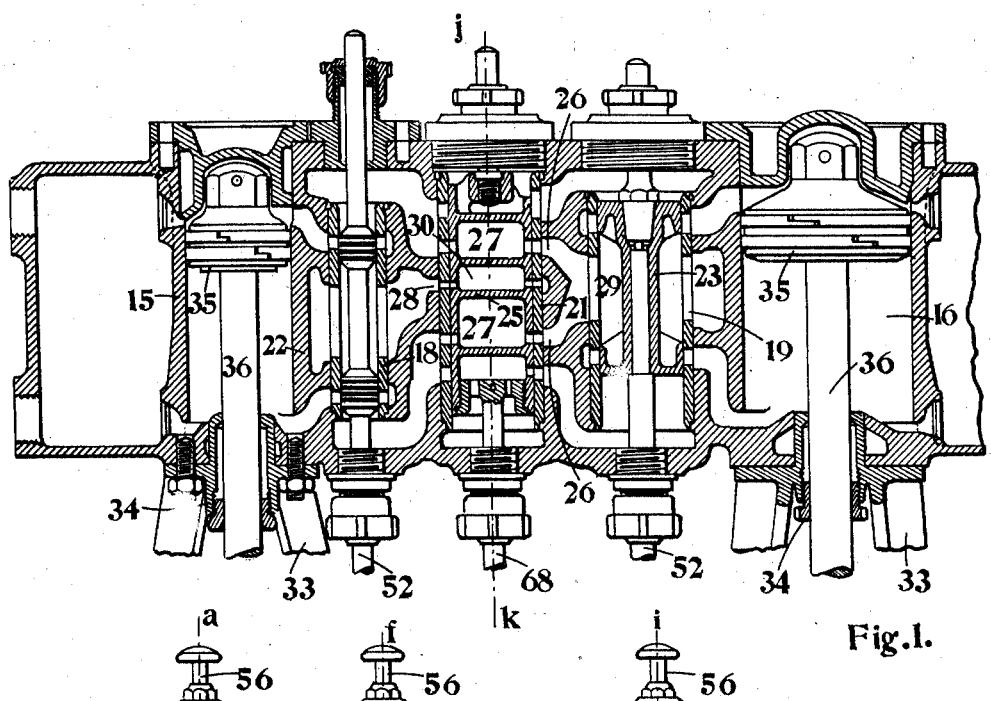
Figure 1 is a vertical section of an engine according to the invention in development along the lines *a, b, c, d, e, f,* in Fig. 3.
Figure 3:
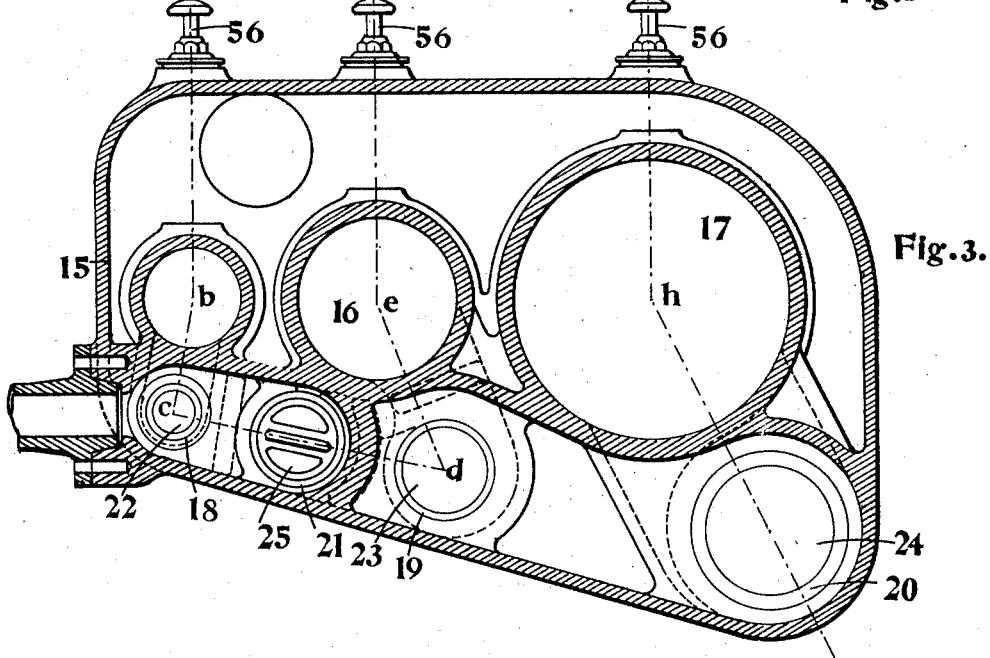
Fig. 3 is a horizontal section.
Figure 2:
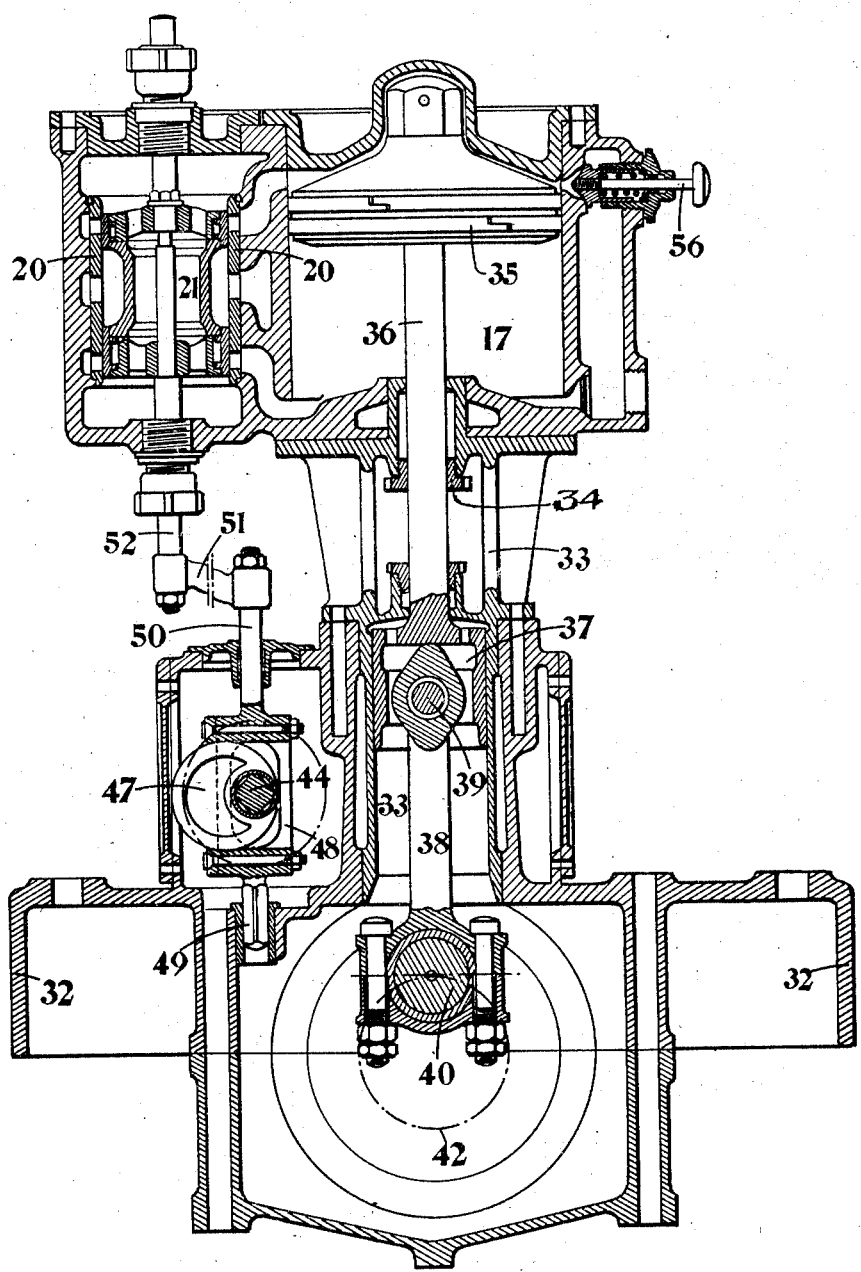
Fig. 2 is another section on the lines *g, h, i* in Fig. 4.
Figure 7:
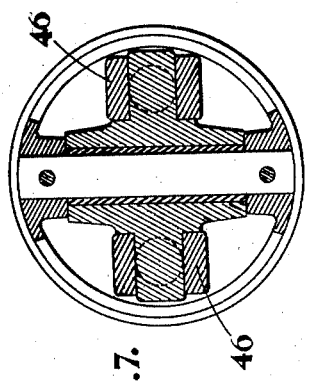
Fig. 7 is a cross section of the universal joint transmitting the movement of the driving shaft to the differential in the rear bridge.
Figure 4:
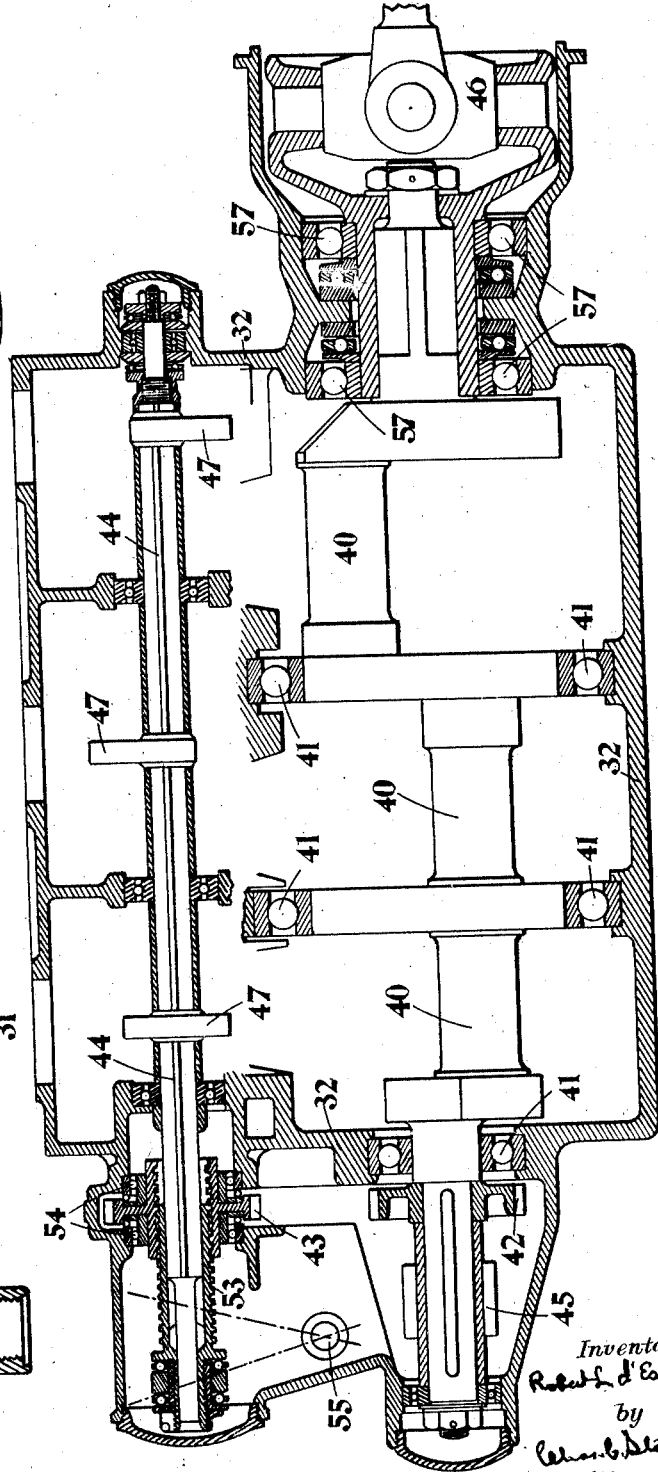
Fig. 4 is a longitudinal section of the lower crank case showing the crank shaft, the control of the distributing valves belonging to each cylinder and the various details.
Figure 6:
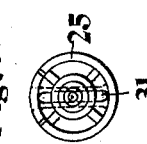
Fig. 6 is a plan thereof.
Figure 5:
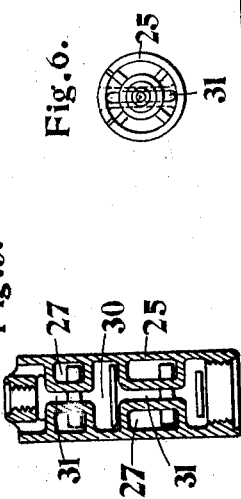
Fig. 5 is a vertical section of the slide valve on the lines *j k* in Fig. 1.

The engine comprises a block of cylinders cast in one piece and comprising the high pressure cylinder 15, the medium pressure cylinder 16 and the low pressure cylinder 17 and also the three ordinary distributing chests 18, 19, and 20 of each of these cylinders and the chest 21 of the combined valve which is hereinafter described.

This type of engine insures to the vehicle to which it is applied a speed which is practically constant within the normal limits of the road gradients owing to the fact that its power is always proportionate to the effort to be overcome. Up to a gradient of 7 per cent., the engine acts by triple expansion; beyond this limit, the triple expansion is transformed into double expansion, the high and medium pressure cylinders working with the live steam of the generator and both exhausting into the low pressure cylinder owing to the combined slide valve becoming operative. This arrangement also presents the great advantage of eliminating any intermediate member between the engine and the drive for the wheels, such as the change speed box generally employed in automobile vehicles, and it attains this advantage without having recourse to excessive pressures.

The three cylinders 15, 16 and 17 are constructed so that the sum of their diagrams approximates as closely as possible to the theoretical diagram of total expansion as is required by the constructional conditions of every multiple expansion engine.

Each of the cylinders 15, 16 and 17 respectively is provided with a cylindrical slide valve (or any equivalent valve) 22, 23, 24 which operates in the chests 18, 19, 20.

Between the distributers or valves 22 and 23 of the high pressure cylinder 15 and the medium pressure cylinder 16, the intercepting valve 25 is interposed (Figs. 1, 3 to 6); this is independent of the rotation of the engine and serves the following purpose:—

Up to a 7% gradient, it permits of operating with the three cylinders 15, 16 and 17 in triple expansion. Beyond this limit, the triple expansion is transformed into double expansion, the high pressure cylinder and the medium pressure cylinder 16 acting with the live steam of the generator and both exhausting into the low pressure cylinder 17.

In this latter method of operation, the intercepting valve 25 places in communication the inlet for the initial steam 28, 29 with the admission ports of the medium pressure cylinder 16 by the intermediary of the chamber 30 and of the central lenticular conduit 31 formed in the intercepting valve. It also places in communication the exhaust ports of the high pressure cylinder 15 with the exhaust pipe 26 of the medium pressure cylinder 16 and it effects this communication by means of the chambers 27. The common exhaust of the cylinders 15 and 16 to the low pressure cylinder 17 is effected by the communication of the conduit 26 with the admission of the low pressure cylinder 17.

In Fig. 1 the intercepting valve 25 is shown in the position for operation by double expansion.

The cylinders 15, 16 and 17 are connected with the crank case 32 by three stay-slideways 33, provided with the stuffing box glands 34, fitted so as to insure perfect centering of each cylinder respectively to the line of the shaft.

The pistons 35 are secured to the rods 36 by known means.

The lower extremity of the cross-head 37 of the rods 36 is forged with the latter and slides in the base of the stay-slideways 33 in order to insure perfect guidance of the parts. This cross head 37 receives the small end of the rod 38 upon a trunnion 39 arranged in the usual manner and at its other extremity this rod 38 is connected with the crank shaft 40 rotating in ball bearings 41.

At one extremity the crank shaft 40 carries a toothed wheel 42 (Fig. 4) which is suitably connected to drive another toothed wheel 43 imparting movement to the distributing or cam shaft 44; it also carries a device 45 controlling the pumps.

At the opposite end the crank shaft 40 is connected with a Cardan head 46 (Fig. 4) which transmits the driving effort to the members acting upon the wheels.

The valves 22, 23 and 24 of the cylinders 15, 16, and 17 are actuated by three eccentric cams 47, each of which operates a cage 48 guided at its lower extremity by a rod 49 and at the upper part by another rod 50 connected by an arm 51 with the rod 52 of the corresponding valve. This method of operating the valves entirely eliminates any influence due to the obliquity of the rods.

The shaft 44 carrying the cams 47 can assume, relatively to the crank shaft 40, positions which are either in advance or in retard, corresponding to different periods of admission and of reversed running.

This result is obtained through the intermediary of a worm 53 sliding on the square shaft 44 of the cams that it drives, its rotation being produced by its nut cut to correspond with the driven pinion 43 which is held in place by ball bearings 54. The longitudinal displacement of this screw 53 is effected by means of a lever pivoted at 55. The different positions of said lever are indicated by straight dotted lines seen to the left in Fig. 4.

Each of the cylinders 15, 16 and 17 is provided with two spring plungers or valves 56 which prevent any excess pressure.

The aluminium crank case 32 incloses the connecting rods 38, the crank shaft 40, the distributing members, the ball bearings 41 and the bearings 57 absorbing any longitudinal thrusts.

The operation of the intercepting slide valve 25 is produced by a lever (not shown) arranged within reach of the driver of the vehicle.

The invention is especially applicable in connection with the steam automobile vehicles described in my application Serial No. 6,425, filed February 6, 1915 of which application the present is a division.

I claim:

1. In a steam driven engine, in combination, three cylinders, one a high, one a medium, and one a low pressure cylinder, a valve and seat for each of said cylinders, an intercepting valve between the high pressure and the intermediate pressure cylinders and a seat for said valve, said intercepting valve seat being provided with communicating openings, said intercepting valve being also provided with openings adapted to register with the seat openings, and means whereby said intercepting valve may be adjusted so as to place all the cylinders tandem for successive expansion or to arrange the first and second so as to operate together and to expand together into the third.

2. I a multi-cylindered engine, in combination, a high pressure cylinder, an intermediate pressure cylinder, and a low pressure cylinder, the high pressure cylinder arranged to receive steam direct from the boiler and to exhaust it into the intermediate and thence into the lower cylinder, a valve chest and valve arranged between the high and the intermediate cylinders, said chest and valve being provided with passages, and means whereby said valve may be arranged at will to admit direct steam to the intermediate and high both, or only to the high as desired, and always to exhaust into the low pressure cylinder whereby the engine may be made to work as a triple expansion engine, or as a compound engine.

3. In an engine having cylinders arranged in expansion series, means whereby steam may be exhausted from the highest pressure cylinder through an intermediate to the lowest pressure cylinder, each of said cylinders being provided with a valve, controlling the admission of steam, a valve arranged between the valves of the cylinders of first and a second pressure, said last named valve being adjustable to admit steam under the highest pressure direct to the cylinder of the second pressure, or to admit thereto only steam exhausted from the cylinder of first pressure, at will.

4. In a multiple cylinder steam engine, in combination, three cylinders arranged in expansion series, a slide valve for each, an intercepting slide valve for two of the cylinders, said valve being arranged to cut off high pressure steam from one of the slide valves or to admit such steam so that two cylinders may be arranged in expansion series or in parallel and means whereby in any case exhaust may be made into a cylinder of lower pressure.

ROBERT LUCIEN D'ESPUJOLS.